Dec. 13, 1960 L. K. PARKER 2,964,598

SIGNAL SWITCHED TELECOMMUNICATION CIRCUITS

Filed July 26, 1956 5 Sheets-Sheet 1

INVENTOR

LESLIE KEARTON PARKER

BY Young, Emery & Thompson

ATTYS.

INVENTOR
LESLIE KEARTON PARKER
BY Young, Emery & Thompson
ATTYS.

Dec. 13, 1960 L. K. PARKER 2,964,598

SIGNAL SWITCHED TELECOMMUNICATION CIRCUITS

Filed July 26, 1956 5 Sheets-Sheet 3

INVENTOR

LESLIE KEARTON PARKER

By Young, Emery & Thompson

ATTYS.

Dec. 13, 1960

L. K. PARKER 2,964,598

SIGNAL SWITCHED TELECOMMUNICATION CIRCUITS

Filed July 26, 1956

5 Sheets-Sheet 4

INVENTOR

LESLIE KEARTON PARKER

BY Young, Emery & Thompson
ATTYS.

INVENTOR
LESLIE KEARTON PARKER
BY Young, Emery & Thompson
ATTYS.

2,964,598
Patented Dec. 13, 1960

2,964,598

SIGNAL SWITCHED TELECOMMUNICATION CIRCUITS

Leslie Kearton Parker, Winklebury, Basingstoke, England, assignor to Telephone Manufacturing Company Limited, London, England, a British company Filed July 26, 1956, Ser. No. 600,263

Claims priority, application Great Britain July 28, 1955

3 Claims. (Cl. 179—170.2)

The invention relates to telecommunication systems employing signal operated switching devices. Such devices are used for example in telephone repeaters and loudspeaking telephone systems, which are then known as voice switched systems. Although the present invention will be described mainly in its application to telephone repeaters and loudspeaking telephones it is to be understood that the invention may be also applicable in analogous situations where the advantage of the invention can be obtained.

A known telephone repeater arrangement comprises similar "go" and "return" circuit branches interconnecting two hybrids at the 2—4 wire terminations, also called terminating sets, and each of these branches contains an amplifier and a signal-controlled attenuator, the "go" and "return" attenuators being differentially controlled by a bridge, which may be in the form of a differential D.C. amplifier, which is responsive to the difference in level between D.C. switching signals derived from the "go" and "return" paths. In such arrangements it is known to apply the attenuation at a point in the respective "go" or "return" path which is a relatively high-energy level point of said path, e.g. at a point following amplification. In repeaters the rectified switching signals may be derived from mutually equivalent points of said paths following the attenuators. In loudspeaking telephone systems, the switching signals may be derived from non-equivalent points of said A.C. signal paths in order to give one side preference over the other.

The known arrangement above referred to can be described as high level switching, this expression indicating that the attenuation resulting from the voice switching operation is applied to a point in the A.C. signal path which when said path is open to signals would be at a high level relative to other points in the path. The improvements now to be described relate to what may be termed low level switching, i.e. the voice switched attenuation is applied at a point in the A.C. signal path, which, when the said path is open to signals, would be at a relatively low energy level compared with other points of the said signal path.

In the known repeater arrangement it will be apparent that due to the relatively high signal level of the point at which attenuation is applied, i.e. following amplification, large switching voltages are required to be applied to the attenuators and therefore a high gain is required in the D.C. amplifier. Therefore not only will the rectifiers and valves have to be large in order to have the necessary power handling capacity, but also there will be a large drain on the power supply which is of considerable significance with battery supply. It is an object of the invention to avoid these drawbacks. It is a further object of the invention to improve the efficiency and speed of switching in such systems.

According to the present invention, in a two-way voice-switched telecommunication circuit the required attenuation of the signals in both the "go" and "return" paths is applied at points of less than maximum energy level in the respective path and specifically at points where amplification is not effected or is not completed.

In signal-switched repeaters the "go" and "return" branches will be so arranged that the required attenuation is effected before final amplification in each case. Small voltage amplifiers may, however, be used at convenient points in the repeater circuit before the attenuators.

On the other hand, the rectified switching signals which control the D.C. amplifier bridge can be derived from the high or low level point of the signal path at will, although naturally the former is preferred since it means that less amplification will be required in the differential D.C. amplifier.

In the case of loudspeaking telephone systems, pre-amplifiers can be omitted, at least in one of the signal paths. The attenuation on the "receive" side will be effected at a low level point in the path from line to the loudspeaker. On the "transmit" side, according to the invention, the voice-switched attenuation is effected before the speech amplifier and, in the case where a pre-amplifier is provided for the microphone before the main speech amplifier, the attenuation will be conveniently effected at the output of the pre-amplifier. The rectified switching voltage will be derived at the "transmit" side from a point in the output circuit of the pre-amplifier which is not subject to the said attenuation affecting the speech path from the microphone so that the usual break-in facility on the "transmit" side is preserved.

The advantages of the voice-switched attenuation at a low level point are briefly: less rigorous working conditions for valves and rectifiers and reduced power consumption, heat dissipation and volume of equipment.

In the known practice of "high level switching" in repeaters use has been made of a single amplifier valve for each direction of transmission, the two valves being connected to form the D.C. amplifier arms of the differential bridge. Due to the D. C. amplification requirement it was necessary for the valves to be large in order to obtain a long grid base, which would permit the valve to amplify the A.C. signals without distortion whilst being able to deal with considerable variation in the concurrent D.C. signals. Apart from this limitation there are also electrical disadvantages of this single valve arrangement, for example, the transient components of the D.C. switching voltage inevitably enter the A.C. signal path and give rise to cross-channel switching, and the leakage reactance of the large output transformers required, since they are in series with the D.C. signal path, delays the D.C. signals and reduces the switching speed. Also with this arrangement and due primarily to the high gain required in the amplifier, the output D.C. voltage derived from the signal has a high ripple content which cannot be adequately smoothed, due to the well known requirement that the D.C. signal path must have a short time constant to allow break-in from either direction. This ripple component is therefore a source of cross-talk which may also adversely affect the switching efficiency.

Accordingly in the preferred arrangement of the present invention, in a signal-switched two-way telecommunication system, e.g. a two-way repeater or a loudspeaking telephone, the A.C. signal amplifying function for one path is combined with the D.C. signal amplifying function for the other path by means of a push-pull amplifier, preferably provided with negative feedback, for the purpose of ensuring effective isolation of the two amplifying paths.

The above and other features of the invention will now be described in more detail and for this purpose reference is now made to the accompanying drawings in which.

Figure 7A:
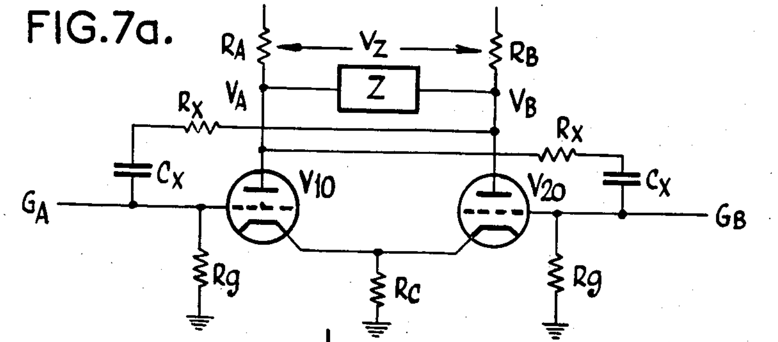
Fig. 7 is a diagram of a known type of differential bridge.

Fig. 7*a* is a simplified circuit of a differential bridge improved transient response.

Figure 7B:
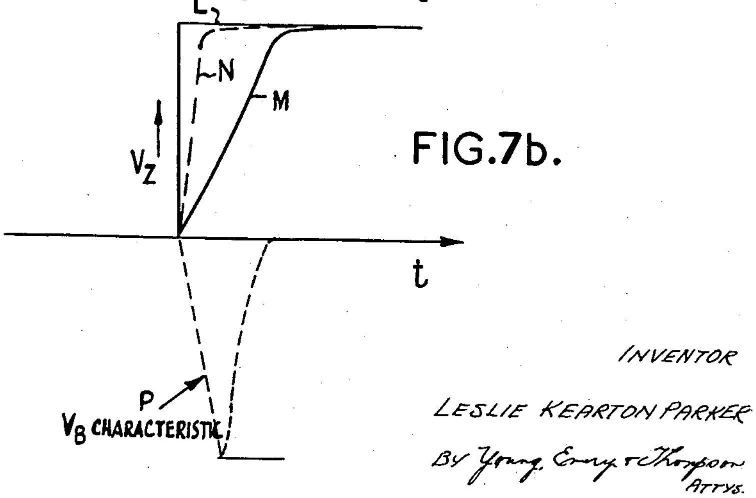

Fig. 7*b* is a diagram showing the effect of Fig. 7*a* on the switching voltage.

Figure 8A:
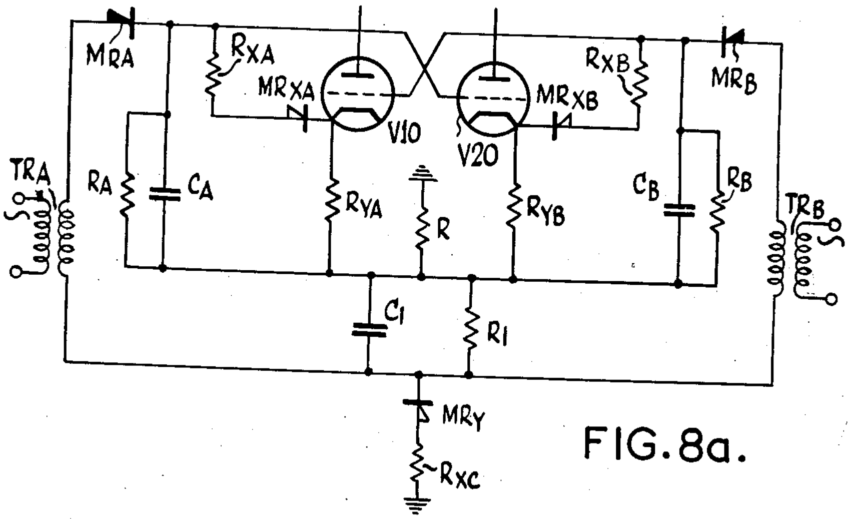

Fig. 8*a* is a circuit schematic of a differential D.C. amplifier with an automatic gain control device.

Figure 8B:
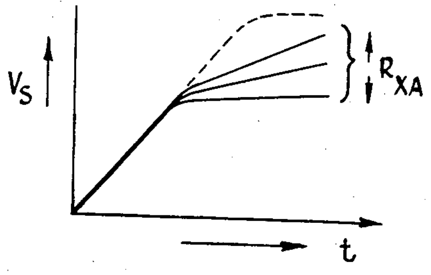

Fig. 8*b* illustrates the effect of the A.G.C. device of Fig. 8*a*.

Figure 1:
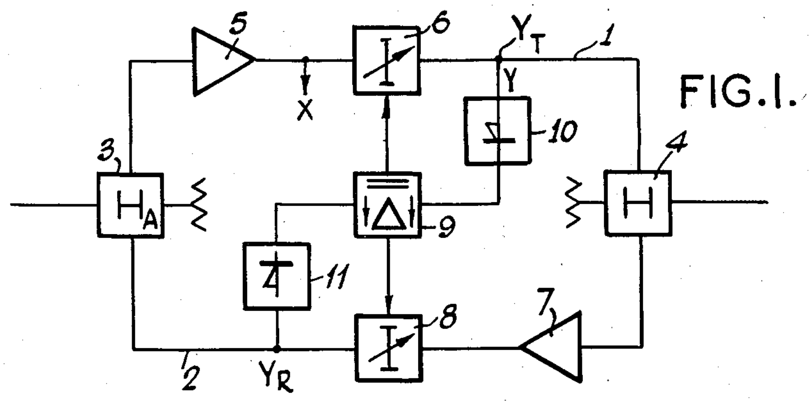
Fig. 1 is a block schematic of a known arrangement for high level switching in a 2-way repeater.

Referring now to the known repeater arrangement of Fig. 1, the similar "go" and "return" branches 1 and 2 interconnecting the two hybrid coils 3 and 4 contain, respectively, amplifiers 5 and 7 and signal controlled attenuators 6 and 8. These attenuators are controlled differentially by a bridge 9, which may be a differential D.C. amplifier, which is responsive to D.C. switching signals derived from points $Y_T$ and $Y_R$ in the respective paths by means of rectifier circuits 10 and 11. It will be seen that the attenuation is applied to the respective signal paths at points following the amplifiers 5 and 7, i.e. at points of relatively high energy level.

Figure 2:
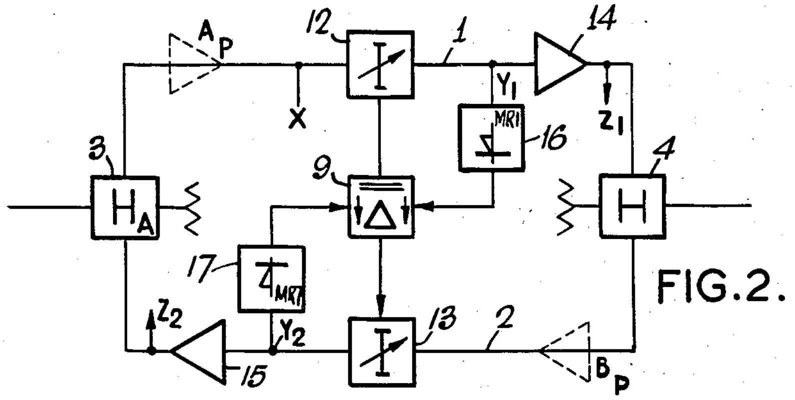
Fig. 2 is a simplified block schematic diagram of a two-way repeater with switched attenuation at low level.

In the block schematic of Fig. 2 showing the principles of a system according to the invention the attenuation is applied by the attenuators 12 and 13 at points of less than maximum energy level, and specifically at points before the main signal amplifiers 14 and 15. The D.C. switching signals which control the bridge 9 may, however, be derived either from the low energy level points $Y_1$ and $Y_2$ of the signal paths by the rectifier circuits 16, 17, as shown in the drawing, or from the high energy level points $Z_1$ and $Z_2$. The latter method would require less amplification in the D.C. amplifier 9 and would be adopted in voice-switched repeaters. Small voltage pre-amplifiers could, if necessary, be employed at points $A_P$ and $B_P$. In the case of loudspeaking telephone systems, 3 would represent an acoustic hybrid to prevent acoustic coupling between the microphone and the loudspeaker. In such systems, unlike in repeaters, it may be desirable to have the switching controls unbalanced to give preference to one path. For example, in Fig. 2, if 1 is the transmit and 2 the receive path, the latter will be low-loss and 1 will be high-loss in the quiescent condition. In order that the transmit path may be seized at any time by the near end speaker the rectified switching voltage is derived for this purpose from a point, such as X, of the transmit path, which is not subject to the attenuation imposed by the attenuator 12, and a pre-amplifier may be provided at $A_P$ in the transmit path. At the receive side the rectified switching signal can be derived from a point, such as $Z_2$, situated after the main amplifier 15, instead of from point $Y_2$, and the pre-amplifier $B_P$ may be omitted from the receive path.

Figure 3:
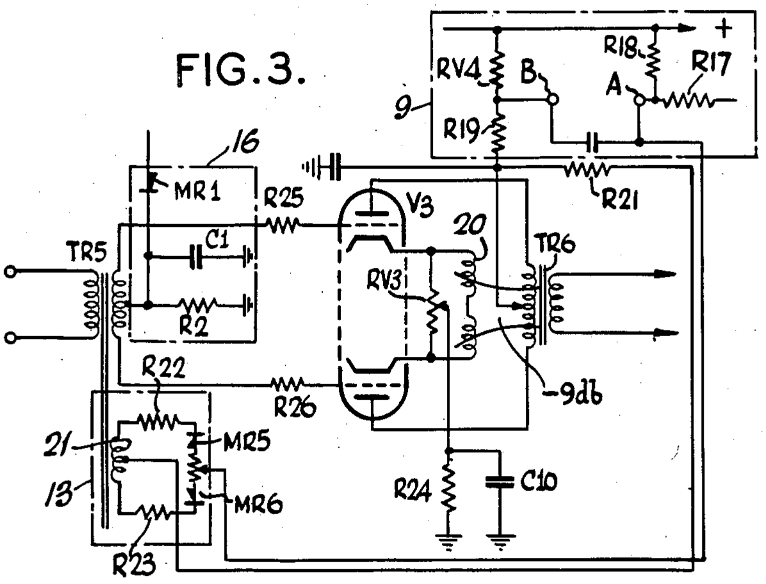
Fig. 3 is a circuit schematic of part of a two-way repeater illustrating the use of push-pull amplifiers for the D.C. and A.C. signals.

A portion of one signal path in a two-way signal switched system is shown schematically in Fig. 3, wherein TR5 represents that section of a hybrid transformer (for example equivalent to hybrid 4 of Fig. 2) carrying the A.C. signals incoming from the line, whilst the references 9, 13, and 16 represent circuits equivalent to the block components similarly referenced in Fig. 2.

Assuming that the arrangement is being used in the receive path of a loudspeaking telephone, the A.C. signal input received from line is applied to the primary of the input transformer TR5, whose secondary is connected through the resistances R25, R26 to the grids of a push-pull amplifier stage V3, corresponding to amplifier 15 of Fig. 2. The rectified switching signal is derived from the transmit speech path (not shown) by means of the rectifier circuit 16 containing rectifier MR1, and is applied at the centre point of the secondary of the transformer TR5, appropriate means being provided, which are here shown in the form of a resistance-capacity circuit R2—C1 connected to earth, to obtain the necessary hangover time of the D.C. switching signal to ensure continuity of speech between syllables. The outputs of the push-pull stage are combined in the primary of an output transformer TR6 and the centre point of this primary is taken to one of the input points of the D.C. control bridge 9. The output points of the bridge are indicated by A and B from which D.C. control signals are taken to the switching attenuators. The cathodes of the push-pull stage are connected to the balanced halves of a further winding 20 of this transformer which are shunted by a resistance RV3 the centre point of which is taken to earth through a parallel resistance-capacity circuit, which is common to the transmit amplifier (not shown). Negative feedback, e.g. of 9 db, is provided between the centre-tapped primary of the output transformer and the said halves of the winding 20 to improve the isolation of the D.C. and A.C. amplifying paths. The A.C. signal output is taken in the known manner from a secondary of the output transformer TR6.

The attenuation of the receive path is applied at a low level point of the said path, i.e. before the amplifier V3, by means of the balanced attenuator circuit 13 comprising the rectifiers MR5 and MR6, resistances R22, R23, and auxiliary winding 21 on transformer TR5. The rectifiers are forwardly or reverse biased according to the polarity of the D.C. control voltage at the bridge control points A, B, and so control the impedance presented to winding 21, which, in turn controls the attenuation in the A.C. signal path to V3. In the case of a loudspeaking telephone the rectifier circuit 16 derives a D.C. switching signal from a point of the transmit path which is always in a low-loss condition, for example, equivalent to the point X of Fig. 2. The arrangement could equally well be applied to a signal-switched repeater with rectified switching signals derived from high energy level points in each A.C. signal path, for example points $Z_1$ and $Z_2$ of Fig. 2.

Apart from the known advantages flowing from the use of push-pull amplification, the described arrangement avoids or reduces the cross-talk between the D.C. and A.C. signal paths since neither the ripple nor the transient components of the D.C. signal can gain access to the A.C. signal path. Also, because smaller transformers are possible, the lower leakage reactance obtainable with the sandwich type windings, which may be used with such transformers, does not reduce the switching speed.

A further feature arising from the employment of push-pull amplifiers is that, instead of using separate transformer windings for the attenuators, such as 21 in Fig. 3, the voice-switched attenuators can readily be directly combined with the amplifiers, either on the input or output side, with a consequent saving in components and reduction in equipment. This facility is possible because the attenuators require a centre-tapped or balanced circuit in order to avoid the inevitable A.C. component being super-imposed on the D.C. control voltage entering the signal path.

Figure 4:
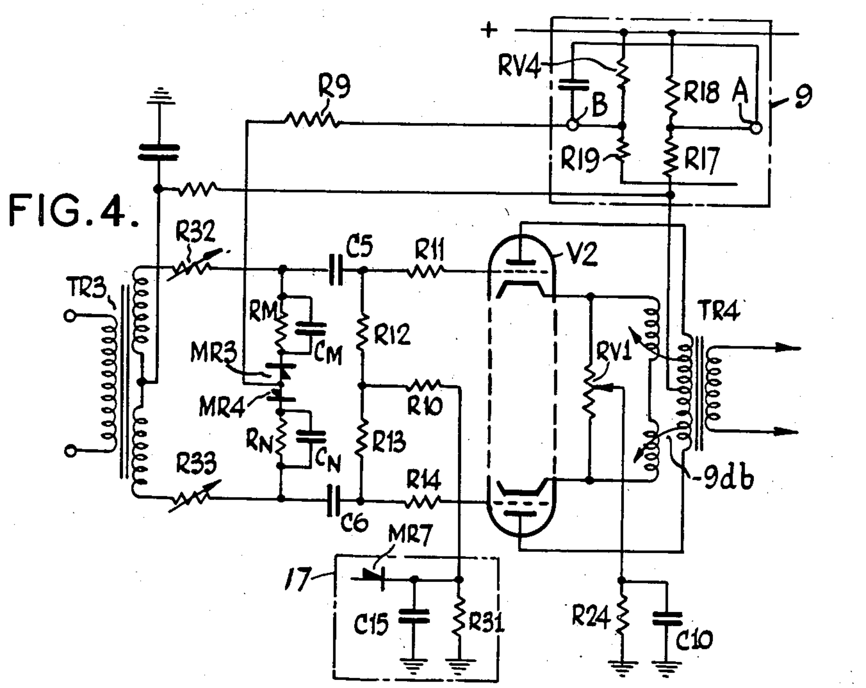
Fig. 4 is a circuit schematic of part of a repeater or a loudspeaking telephone terminal similar to Fig. 3 modified to combine the attenuator with the push-pull input.

As an example of the application of this feature to repeaters and loudspeaking telephones reference is now made to Fig. 4, which shows a push-pull arrangement generally similar to that of Fig. 3 above described, but modified for direct inclusion of the attenuator. It will be convenient here to regard this as showing a part of the transmit path in a loudspeaking telephone system of which Fig. 2 represented the receive path. In this figure 9 again indicates the D.C. control bridge arranged as in Fig. 3. The A.C. signals are applied to the input of the transmit push-pull amplifier stage V2 through the transformer TR3. Attenuation is applied directly to the transmit path at a relatively low-level point thereof by connecting the two respective output control points A and B of the D.C. bridge to the centre point of the secondary of the input transformer TR3 and to the centre point of two rectifier and resistance branches MR4, $R_N$ and MR3, $R_M$ connected across said secondary. It will be understood that, with the correct polarity of the D.C. control points A and B, the impedance presented to the secondary of TR3 by the rectifiers will be low and will constitute a virtual short circuit across the secondary, thus attenuating the A.C. signals to an extent depending on the resistances in the attenuator circuit. The D.C. switching signal, derived from the receive speech by the rectifier circuit 17, is applied direct to the grids of the push-pull stage through a resistance network R10 to R14 giving the required algebraic relation between the voltages at the grids for push-pull operation, and the D.C. portion of the input circuit is decoupled from the A.C. portion by capacitors C5 and C6. The rectifier circuit 17 in this case includes, besides rectifier element MR7, the R–C circuit R31—C15 having a time constant designed to give the switching signals the appropriate hangover time.

Low frequency attenuator limiters are conveniently incorporated in the rectifier attenuation network at the A.C. side of the push-pull input. In the circuit shown, the capacitors $C_M$ and $C_N$ form, with the resistors $R_M$ and $R_N$, such attenuator limiters. The A.C. output side of the push-pull stage V2 is arranged similarly to that in Fig. 3, the transformer TR4 forming the transmit side of the hybrid 4 of Fig. 2. In this case the D.C. output of the push-pull stage V2 is taken to point B of the D.C. control bridge. The variable resistors R32 and R33 in the attenuator circuit serve the function of maintaining the proper impedance to the source and enabling the attenuator to be varied without altering the transformer ratios.

Figure 5:
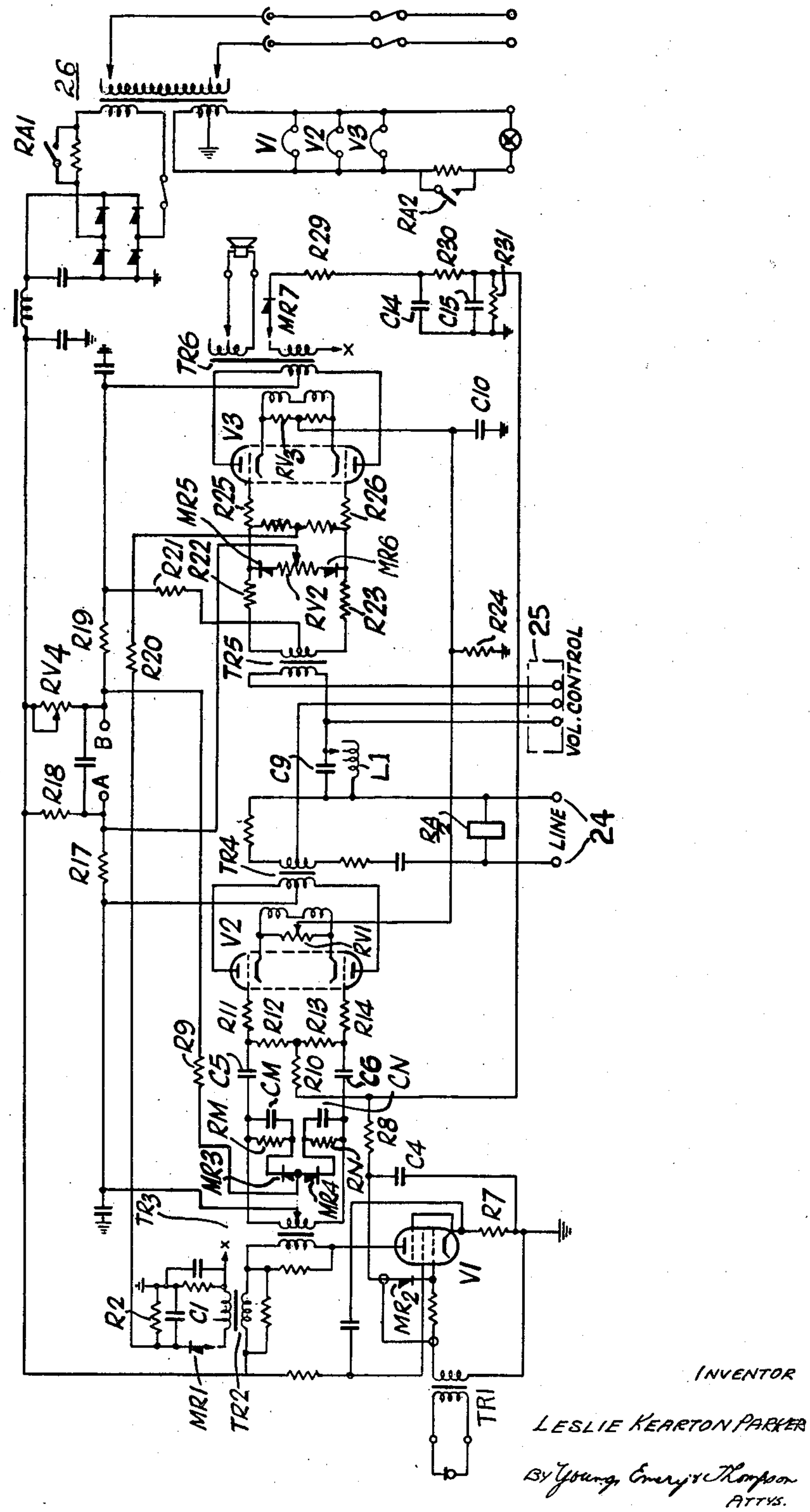
Fig. 5 is a complete circuit schematic of a loudspeaking telephone terminal embodying the improvements of Figs. 2, 3 and 4.

Figure 5 shows a complete circuit schematic of a loudspeaking telephone system incorporating the arrangements of the general type illustrated in Figs. 3 and 4 for applying attenuation at low level points in the receive and transmit speech paths. In these figures the same reference numerals are used to indicate corresponding components and circuits. At the transmit side, the main amplifier stage V2 is arranged in the same manner as Fig. 4. At the receive side the speech amplifier V3 is a push-pull stage generally similar to that in Fig. 3, with the exception that the attenuator for the incoming speech, consisting of rectifiers MR5, MR6 and resistors R22, R23, is incorporated directly in the input side of the push-pull stage in the same manner as at the transmit side instead of using the separate transformer winding as shown in Fig. 3 for the attenuator 13.

TR4 and TR5 represent the transmit and receive sections of the hybrid transformer connecting the transmit and receive paths to the line terminals 24 in known manner through a mains hum rejector C9—L1 and a volume control unit 25. 26 represents a known type of power supply with mains transformer, rectifier and smoothing unit. RA/2 represents a line relay having contacts RA1 and RA2 as shown in the power supply unit 26.

A separate pre-amplifier $V_1$ is provided for the microphone circuit of the loudspeaking telephone, and this pre-amplifier is separated from the main transmit amplifier V2 by the intervening variable attenuator network. With this arrangement changes in the state of the attenuator network are reflected back as changes in anode load on the pre-amplifier which, if the latter is arranged as a voltage amplifier, would result in undesired changes in the amplification of the A.C. signal. This interaction would normally be overcome by fitting a buffer amplifier of approximately unity gain, e.g. a cathode follower, between the preamplifier and the attenuator. However, it is preferred in the arrangement of the present invention, to avoid the interaction between the attenuator and preamplifier by making the latter of the constant current type. This is conveniently done by omitting the cathode decoupling capacitor, which, normally, would be connected in parallel with the bias resistor R7 i.e. by allowing negative feedback to render the gain independent of changes in the anode load.

In order to further improve the speed of switching from "transmit" to "receive" the D.C. switching signal derived from the "receive" side by the rectifier circuit MR7, R29—R31 and C14—C15, is applied not only to the transmit side of the D.C. amplifier at R10, but is also supplied to the pre-amplifier through the microphone muting circuit R8, MR2. In this way the gain of V1 is reduced during the switching of the circuit to the "receive" condition. C4 is a decoupling capacitor for the muting circuit.

The general operation is that currents due to incoming speech operating the microphone M are fed by way of the transformer TR1 to the control grid of the preamplifier valve V1. The anode circuit of this valve includes the primaries of the transformers TR2 and TR3. The secondary of transformer TR2 provides the D.C. switching signal to the control grids of the receive amplifier by way of rectifier MR1 in association with the time-constant circuit formed by capacitor C1 and resistor R1. The centre-tapped secondary of transformer TR3 feeds the push-pull double-triode V2. This valve draws its anode current by way of the centre-tapped primary of the transmit portion TR4 of the hybrid transformer and resistors R17 and R18 of the bridge circuit. From the secondary of TR4 the microphone output is supplied to the line terminals 24 and in view of known balancing arrangements does not affect the receive portion TR5 of the hybrid.

Speech currents incoming over the line however traverse TR5, from the centre-tapped secondary of which they pass to the push-pull double-triode V3 forming the receive amplifier. The anode circuit of this valve includes the transformer TR6, from the secondary of which the loudspeaker LS is operated. A tertiary winding on transformer TR6 provides the D.C. switching signal over MR7 and its associated time-constant, this signal being applied to the control grids of the transmit amplifier. It will be seen that the primary winding of TR6 is centre-tapped and the anode circuit includes the resistors RV4 and R19, forming the other arms of the differential bridge. It will be appreciated that the potential between the points A and B on the bridge will vary according as transmission or reception is taking place and this variation is employed to control the rectifier attenuators.

It will be seen that the junction point of the rectifiers MR3 and MR4 connected across the secondary of transformer TR3 is connected to point B while the centre point of the secondary is connected to point A by way of resistor R17. Similarly, the junction point of the rectifiers MR5 and MR6 connected across the secondary of transformer TR5 is connected to point A while the centre-tapping of the secondary is connected by way of resistors R21 and R19 to point B. In this case the rectifiers are connected by the variable resistor RV2 so as to permit adjustment to obtain the best results.

As already explained, when the potential between terminals A and B is such as to render the rectifiers conductive, they form a comparatively low resistance shunt across the secondary of the transformer and thus introduce considerable attenuation. In the high resistance condition, however, their effect is substantially negligible.

Figure 6:
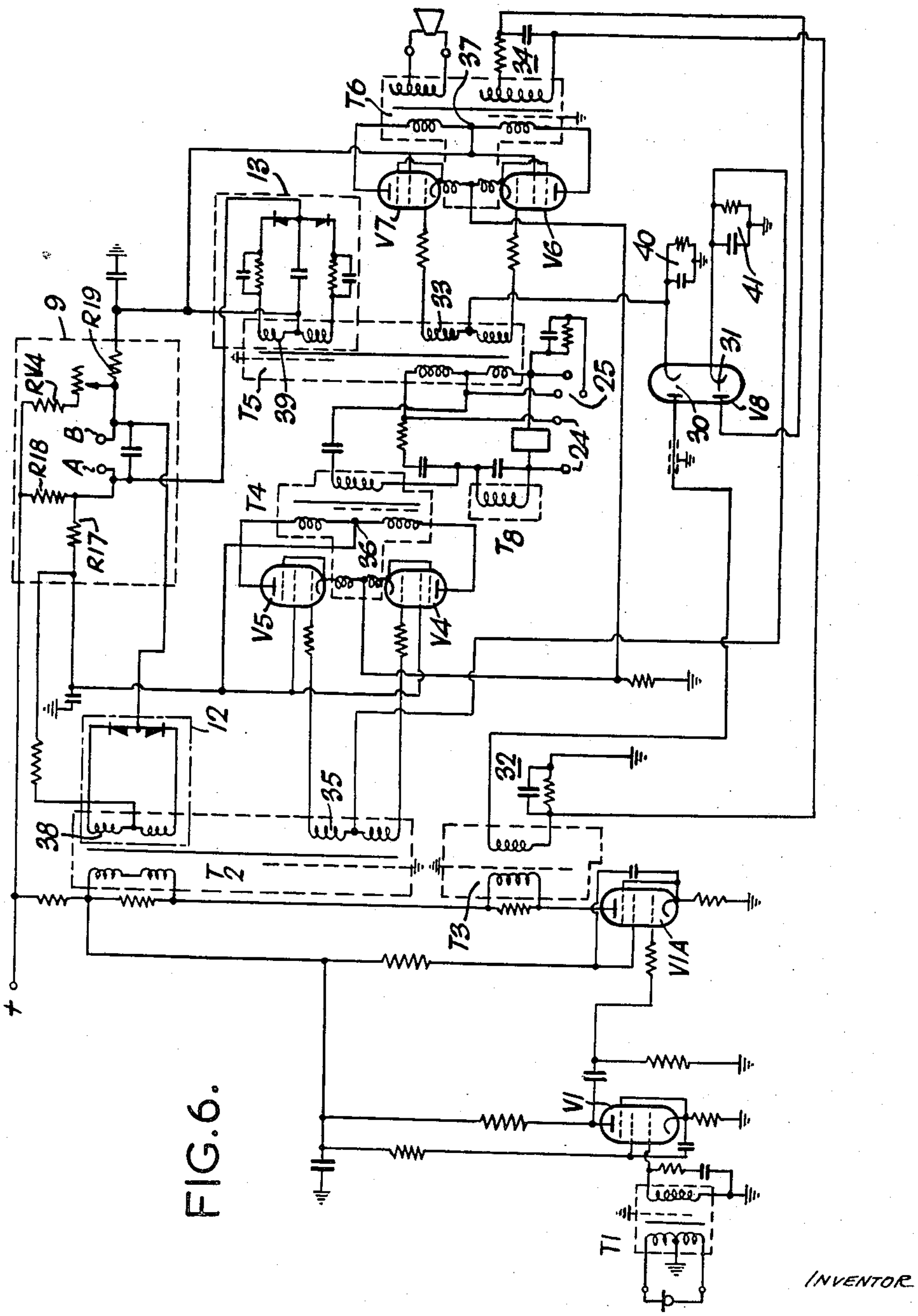
Fig. 6 is a circuit schematic of a loudspeaking telephone terminal modified in certain respects as compared with Fig. 5.

Fig. 6 shows a circuit schematic of a loudspeaking telephone terminal employing attenuation at low energy level points of the microphone and loudspeaker paths. In this case the attenuators for the "transmit" and the "receive" paths are arranged similarly as in Fig. 3, i.e. externally of the input to the main speech amplifiers. In the transmit path, the microphone speech is amplified in a pre-amplifier of the constant current type comprising resistance-capacity coupled stages V1 and V1A. The main speech amplifier for the transmit path consists of the pentode push-pull stage V4—V5 and for the receive path a similar push-pull stage V6—V7. As already explained these push-pull stages operate separately as A.C. amplifiers for the speech in the transmit and receive paths and also, jointly, as a differential D.C. amplifier for rectified switching signals derived from these paths. The rectifier circuit for deriving the switching signal from the transmit path comprises diode section 30 of the double diode valve V8, and secondary circuit 32 of transformer T3, this signal being applied to push-pull stage V6—V7 at the mid point of winding 33. The rectifier circuit for the receive path similarly comprises diode 31 and secondary circuit 34 of transformer T6, the signal being applied to push-pull stage V4—V5 at the mid point of winding 35 on transformer T2. The appropriate time constants for these signals are determined, in part by the resistance-capacity circuits 40 and 41. The D.C. output of stages V4—V5 and V6—V7 is taken from points 36 and 37 respectively to provide a voice-switching control voltage at the points A, B of the control bridge 9. The attenuators 12 and 13 for the transmit and receive paths are each associated with individual secondary windings 38, 39 on the transformers T2 and T5 and are connected to the bridge control points A, B as shown.

The general method of operation is substantially the same as in the Figure 5 arrangement except for the difference due to the fact that the rectifier attenuators are not combined with the push-pull amplifiers but operate by way of a separate transformer winding. Moreover, in Fig. 6 the rectifiers for providing the D.C. switching signals are shown as diodes. Thus, speech currents from the microphone M traverse the transformer T1 by which they are fed to the control grid of the grid-stage pre-amplifier valve V1 from the anode of which they are supplied to the second stage valve V1A. The anode circuit of this valve includes the primary windings of the transformers T2 and T3. The secondary winding 38 of T2 is coupled to the rectifier attenuator and a tertiary winding 35 supplies the push-pull amplifier comprising the pentode valves V4 and V5. The anode circuits of these valves include the windings of the transformer T4 and resistors R17 and R18, forming part of the differential bridge. The secondary winding of T3 supplies the D.C. switching signal by way of the diode 30 to the receiver amplifier.

As in the Figure 5 case, the connections of the portions T4 and T5 of the hybrid transformer prevent the amplified microphone currents being fed to the receiver. Speech currents incoming over the line by way of terminals 24 pass through transformer T5 having a secondary winding 39 associated with the rectifier attenuator and a tertiary winding 33 which supplies the push-pull amplifier comprising the pentode valves V6 and V7. These supply the transformer T6 and the anode circuit includes resistors R19 and RV4 of the differential bridge. Transformer T6 has a tertiary winding from which the D.C. switching signal is obtained by way of the diode 31 and this signal is fed to the centre point of the tertiary winding of transformer T2. As before, the working of the bridge involves potentials of different polarity between the terminals A and B and these serve to control the resistance of the rectifiers and hence the attenuation introduced thereby.

It will be understood that the loud-speaking telephone terminal shown in Fig. 6 will derive its power from a mains supply unit such as 26 of Fig. 5, and may also have a microphone muting rectifier such as MR2 of Fig. 5, and that these components have been omitted for the sake of clearness.

Speed of switching is important in signal-switched systems such as those above described, and this depends largely on the response of the differential bridge which controls the switching.

Figure 7:
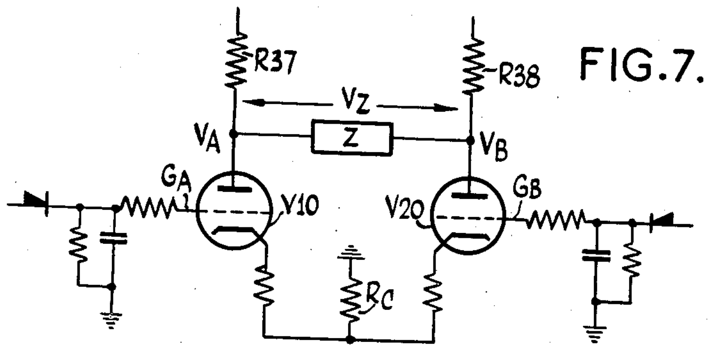

Consider, for example, the known type of differential bridge exemplified in Fig. 7 and consisting of two valves V10 and V20 whose cathodes have a common series resistor $R_C$ and which, in response to the instantaneous relative levels of input D.C. signals applied to the grids, develop at their anodes a potential difference which is applied to a load Z, e.g. a variable attenuator network, connected between the anodes.

When the potential at the grid of the first valve V10 becomes positive with respect to that of the other valve V20 due to the application of a D.C. signal, the anode potential of the first valve $V_A$ becomes negative with respect to the potential $V_B$ of the second valve. However due to the potential divider effect of the load impedance Z connected between the anodes and of the resistance R38 connected in the anode lead of the valve V20, there is also a potential drop across the latter resistance which causes the anode potential $V_B$ of the second valve also to become negative with respect to its original potential value, with the consequence that the effective potential difference, say $V_Z$, between the anodes is initially less than would be expected. This effect is ultimately minimized by the existence of the common cathode resistor R which effectively makes the grid potential $G_B$ of the second valve V20 more negative than it was originally as current is increased through the first valve. The effect of this is that the anode potential of the second valve again rises and a steady state is obtained wherein $V_Z$ has the expected value. Assuming the load connected between the anodes of the valves to be an inductive circuit, e.g. a relay or a variable attenuator circuit containing inductance, the effect above described results in a characteristic for the potential difference $V_Z$ which is considerably delayed as compared with the ideal characteristic.

An arrangement according to the present invention intended to correct this delay is shown in Fig. 7(*a*) in which the anodes and signal grids of a pair of valves V10, V20 arranged as a differential bridge are each cross connected by means of a series circuit comprising capacitance $C_X$ and resistance $R_X$ whose values are such as to correct the normal transient delay of the bridge. This will be achieved due to the fact that when one grid is made positive, e.g. by a D.C. signal at $G_A$ the second grid $G_B$ is given a bias whose slope and amplitude will apply the desired correction. The grid of each valve is connected to earth through a leak resistor $R_g$. The series resistor $R_X$ at one side of the capacitor $C_X$ and the grid leak resistor $R_g$ at the other side of the capacitor act as a potential divider for the charge stored on the condenser. The time constant of the correcting bias applied to the respective grid is determined by the values of the capacitors and resistors in the series circuits which thus cross-connect the grids and the anodes.

The effect above described is illustrated in Fig. 7(*b*), wherein L represents the desired or ideal characteristic of the potential difference $V_Z$ appearing across Z whilst M represents the effective characteristic obtained by the bridge of Fig. 7. The dotted line P represents the transient variation of the potential $V_B$ of the second valve under the conditions above described resulting in the characteristic M. With the circuit of Fig. 7(*a*), $V_B$ varies as $$\mu\frac{R_X}{R_x+R_g}$$

where $\mu$ is the amplification factor of the valve V20. The curve N represents the improved characteristic of $V_Z$ obtained with the circuit of Fig. 7(*a*).

There will now be described an automatic level control means in two-way switched circuits. In the foregoing, reference has already been made to means of controlling voice switching attenuators in 2-way repeaters and loudspeaking telephones comprising a differential D.C. amplifier, such as stages V2 and V3 of Fig. 5, which is responsive to the relative levels of rectified switching signals applied thereto to develop a control voltage for the attenuators. In such circuits it has already been explained that each input circuit to the differential D.C. amplifier shall have a suitable time constant to preserve continuity of speech but at the same time to allow break in from the unused path. When each of these said input circuits is provided with a resistance-capacitance time delay network the tendency is present for the hangover time to be longer with strong signals and shorter with weak signals, i.e. to follow the level of the applied D.C. signal. One method of counteracting this tendency has already been proposed consisting in connecting each of the time delay networks which are associated with respective input circuits to a common time delay network whose time constant is smaller than at least one of the first mentioned time delay networks. This common network operates as an inhibitor network against leakage signals and also assists in limiting the stronger signals.

A further improvement designed to counteract the tendency for the hangover time to follow the level of the D.C. switching voltage has also been proposed consisting broadly in the introduction of a non-linear characteristic into the time delay network, and specifically in providing a rectifier attenuation network for the switching path dependent on the polarity and magnitude of the control voltage developed by the D.C. amplifier bridge.

According to a further feature of the present invention an automatic level control device for D.C. switching signals in a two-way voice switched circuit comprises a rectifier and resistor combination connected in such a manner as to divert a proportion of the said signal voltage when the said voltage exceeds a given value of bias determined by components connected in the respective input circuit.

More specifically the limiting of higher level D.C. switching signals is performed by arranging that the said rectifiers are in the conducting condition, and so lower the D.C. switching voltage, only when the said switching voltage exceeds the level of the cathode bias applied by means of a common cathode resistor in series with the cathode resistor individual to the respective valve.

In an exemplary embodiment shown in Fig. 8(*a*) each of the valves V10, V20 comprised in a differential D.C. amplifier for a voice switched two-way circuit are provided with input circuits adapted to receive portions of the speech voltage derived from the respective A.C. signal path, and rectified by rectifier MRA for V20 and by rectifier MRB for V10. Each of these input circuits is provided with a time delay network $R_A$—$C_A$ and $R_B$—$C_B$ and each of these networks is connected to a common inhibitor network R1—C1. Each valve is provided with cathode bias by means of an individual series resistor $R_{YA}$ and $R_{YB}$ and a common resistor R. Each input circuit is also provided with an automatic level control device consisting of a resistor and rectifier $R_{XA}$—$MR_{XA}$ for V20 and $R_{XB}$—$MR_{XB}$ for V10. These circuits are branched off from the input to the valve and connected to the cathode of the opposite valve such that any D.C. signal voltage in excess of the bias determined by the combined cathode resistors renders the rectifier conducting to earth. This arrangement has a marked limiting effect on the voltage characteristic of the switching signal which is flattened at the point when the D.C. switching voltage exceeds the said bias value. This effect is illustrated in Fig. 8(*b*) where the curve of the switching voltage $V_S$ is shown flattened to an increasing degree with different values of $R_{XA}$.

In addition in the circuit shown in Fig. 8(*a*) a rectifier and resistor combination $MR_Y$—$R_{XC}$ is connected to earth from the common junction point of the inhibitor circuit $R_1$—$C_1$ with the negative ends of the secondaries of the respective input transformers $TR_A$ and $TR_B$. This resistor-rectifier combination prevents the limiting effect exerted by the level control rectifier circuit upon the time delay circuit of the respective amplifier from being reflected back into the inhibitor circuit $R_1$—$C_1$.

I claim:

1. In a voice-switched two-way telecommunication system, a first pair of thermionic valves each including an anode, a cathode and a control electrode and forming a push-pull amplifier for one direction of transmission, a second pair of thermionic valves each including an anode, a cathode and a control electrode and forming a push-pull amplifier for the other direction of transmission, a common cathode resistor for both said pairs of valves, a first resistor in the anode circuit of said first pair of valves, a second resistor in the anode circuit of said second pair of valves, said valves and said resistors being connected so as to form a differential amplifier, a first transformer having a centre-tapped winding arranged to provide an input to the control electrodes of said first pair of valves for said one direction of transmission, a first pair of rectifiers connected back-to-back across said winding of said first transformer, a second transformer having a centre-tapped winding arranged to provide an input to the control electrodes of said second pair of valves for said other direction of transmission, a second pair of rectifiers connected back-to-back across said winding of said second transformer, connections from the junction of said first resistor with said anodes of said first pair of valves extending to the centre-tap of said winding of said first transformer and to the junction point of said second pair of rectifiers, and connections from the junction of said second resistor with said anodes of said pair of valves extending to the centre-tap of said winding of said second transformer and to the junction point of said first pair of rectifiers.

2. In a voice-switched two-way telecommunication system, a first pair of thermionic valves each including an anode, a cathode and a control electrode and forming a push-pull amplifier for one direction of transmission, a second pair of thermionic valves each including an anode, a cathode and a control electrode and forming a push-pull amplifier for the other direction of transmission, a common cathode resistor for both said pairs of valves, a first resistor in the anode circuit of said first pair of valves, a second resistor in the anode circuit of said second pair of valves, said valves and said resistors being connected so as to form a differential amplifier, a first transformer having a first centre-tapped winding arranged to provide an input to the control electrodes of said first pair of valves for said one direction of transmission, a second centre-tapped winding on said transformer, a first pair of rectifiers connected back-to-back across said second winding of said first transformer, a second transformer having a first centre-tapped winding arranged to provide an input to the control electrodes of said second pair of valves for said other direction of transmission, a second centre-tapped winding on said second transformer, a second pair of rectifiers connected back-to-back across said second winding of said second transformer, connections from the junction of said first resistor with said anodes of said first pair of valves to the centre-tap of said second winding of said first transformer and to the junction point of said second pair of rectifiers, and connections from the junction of said second resistor with said anodes of said second pair of valves extending to the centre-tap of said second winding of said second transformer and to the junction point of said first pair of rectifiers.

3. In a voice-switched two-way telecommunication system, a first main amplifier of the push-pull type for one direction of transmission, a second main amplifier of the push-pull type for the other direction of transmission, an auxiliary amplifier preceding said first main amplifier, first and second rectifier attenuators associated respectively with the input sides of said first and second main amplifiers, means jointly controlled by said first and second main amplifiers for selectively increasing the attenuation of either of said first and second rectifier attenuators, and means controlled by said second main amplifier for reducing the gain of said auxiliary amplifier preceding said first main amplifier.

References Cited in the file of this patent

UNITED STATES PATENTS

| | | |
|---|---|---|
| 2,054,906 | Lewis | Sept. 22, 1936 |
| 2,273,945 | Fisher | Feb. 24, 1942 |
| 2,379,768 | Van Wynen | July 3, 1945 |
| 2,468,552 | Herrick | Apr. 26, 1949 |
| 2,468,553 | Herrick | Apr. 26, 1949 |
| 2,677,729 | Mayne | May 4, 1954 |
| 2,702,319 | Ryall | Feb. 15, 1955 |
| 2,780,682 | Klein | Feb. 5, 1957 |